A. W. JOINER.
PACKING.
APPLICATION FILED FEB. 3, 1912.
1,032,838.
Patented July 16, 1912.
2 SHEETS—SHEET 1.
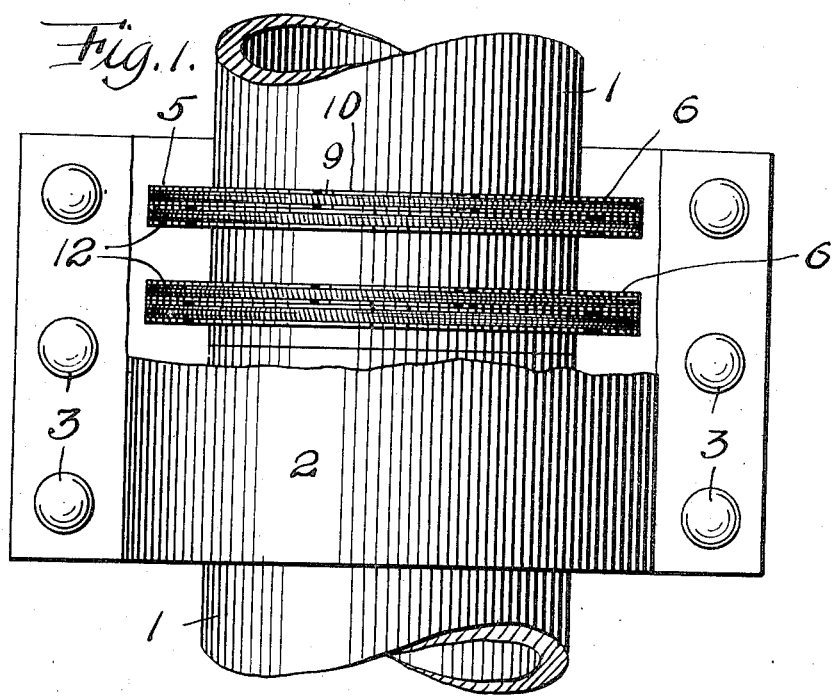
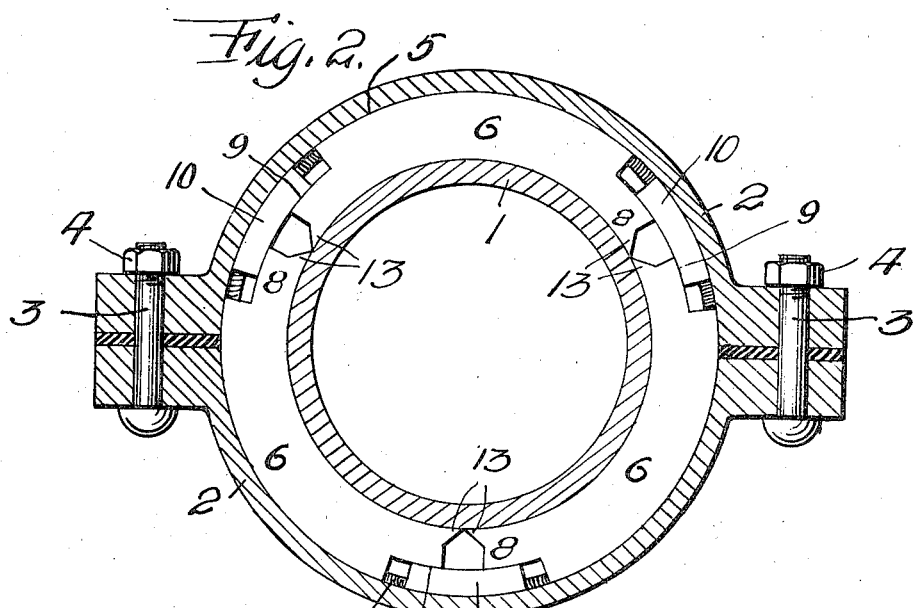
WITNESSES
INVENTOR
A. W. Joiner
BY
ATTORNEYS A. W. JOINER.
PACKING.
APPLICATION FILED FEB. 3, 1912.
1,032,838.
Patented July 16, 1912.
2 SHEETS—SHEET 2.
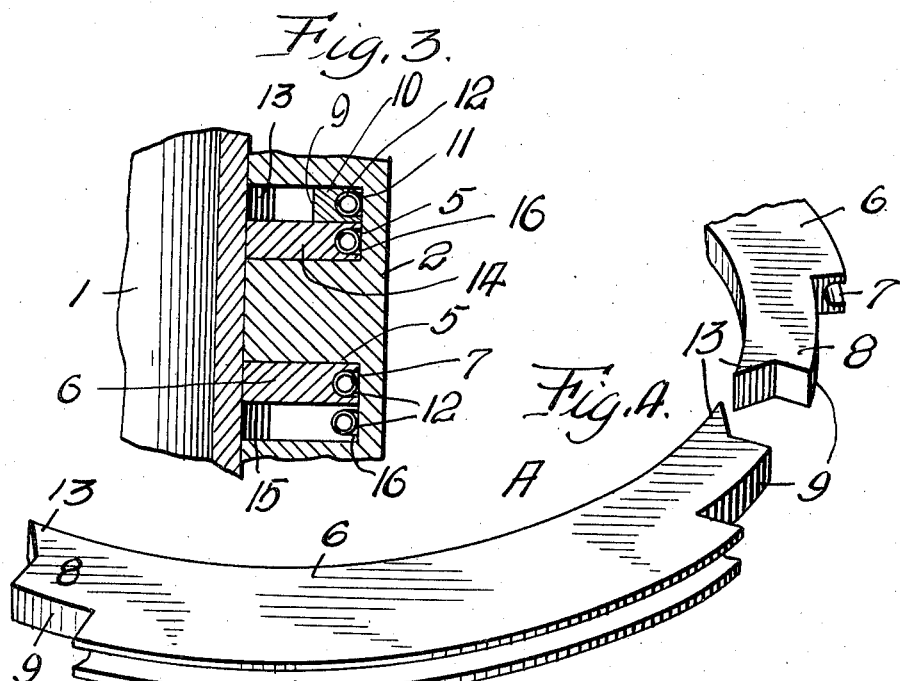
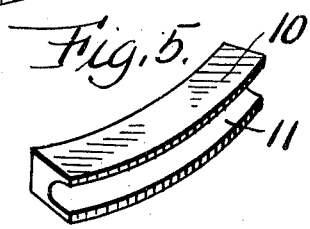
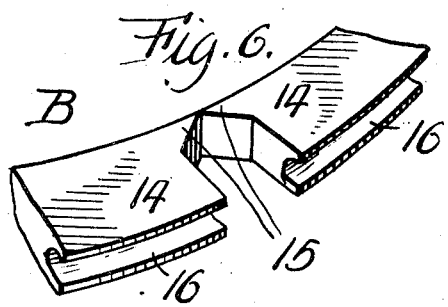
WITNESSES
INVENTOR
A. W. Joiner
BY
ATTORNEYS

UNITED STATES PATENT OFFICE.

ALLEN W. JOINER, OF BRAVE, PENNSYLVANIA.

PACKING.

1,032,888.

Specification of Letters Patent.    Patented July 16, 1912.

Application filed February 3, 1912. Serial No. 675,101.

*To all whom it may concern:*

Be it known that I, ALLEN W. JOINER, a citizen of the United States of America, residing at Brave, in the county of Greene and State of Pennsylvania, have invented certain new and useful Improvements in Packing, of which the following is a specification, reference being had therein to the accompanying drawing.

This invention relates to packing, and more particularly to a metallic packing used in connection with gas and steam engines, gas and air compression rods and fluid conduit pipes, piston rods and movable bodies.

My invention aims to provide a metallic packing embodying sets of sectional rings provided with means for frictionally retaining said rings in engagement with the body upon which they are mounted to provide a non-leakable connection between said body and said rings, such connection being advantageous in connection with a coupling or the abutting ends of two pipes.

My invention further aims to provide a sectional packing ring that will compensate for the wear upon said rings in a manner that insures a positive bearing of the rings upon the body surrounded by said rings.

My invention further aims to accomplish the above results by a mechanical construction that is not liable to injury by ordinary use, inexpensive to manufacture and highly efficient for the purposes for which it is intended.

With this understanding of the principal objects of my invention, reference will now be had to the drawings wherein there is illustrated a preferred embodiment of the invention, but it is to be understood that the structural elements thereof are susceptible to such changes as fall within the scope of the appended claims.

In the drawings like numerals denote corresponding parts throughout the several views, in which:—

Figure 1 is a plan of a case provided with the packing rings, the case being partly broken away, Fig. 2 is a cross sectional view of the same, Fig. 3 is a horizontal sectional view of a portion of the case, Fig. 4 is a perspective view of one of the packing rings, Fig. 5 is a perspective view of a connecting member of one of the packing rings, and Fig. 6 is a perspective view of a portion of one of the packing rings.

The reference numeral 1 denotes the confronting ends of pipes or movable body and surrounding the movable body is a two-part case 2, the parts of the case being connected together by bolts 3 and nuts 4. The two-part case has grooves 5 to accommodate my improved packing rings, and as shown in Figs. 1 and 3, the grooves 5 are spaced apart whereby the packing rings will have separate and independent bearings upon the movable body 1. The packing rings are arranged in sets and are generally designated A and B, each ring consisting of a plurality of flat sections that snugly fit within the grooves 5. The sections of the ring A are designated 6, these sections being segment-shaped with the outer edges thereof provided with grooves 7 that are U-shaped in cross section. The confronting ends of the sections 6 are cut away to provide tongues 8, said tongues providing a seat 9 for a segment-shaped bridge member 10 that has the outer edge thereof provided with a groove 11, U-shaped in cross section and adapted to aline with the grooves 7 of the sections 6, the grooves 11 of the connecting member 10 representing a continuation of the grooves 7 of the sections 6. The members 10 are of a less length than the cut away portions of the sections 6, but sufficiently long to bridge the cut in ring plus a reasonable amount to lap on opposite tongue to insure a tight joint and also to prevent coupling members from dropping into the cut should it be moved to the end of the working extremity. Arranged in the grooves 7 and 11 are coiled compression springs 12 for retaining the inner edges of the sections 6 in snug engagement with the periphery of the pipes 1 or the movable body.

The confronting ends of the tongues 8 are provided with abutting lips 13 and I attach considerable importance to these lips, as it is through the medium of the same that the sections are prevented from rocking or shifting relatively to the movable body until said lips are worn flush with the ends of the tongues 8. It is in this connection that I am aware of sectional packing rings having abutting ends of considerable area, for instance, the area of the ends of the tongues 8 without the lips 13. When such bearing rings wear, the arc of the bearing surface of said rings is changed, and as the ends of the bearing rings are not worn, the rings maintain their original position relatively to each other while the bearing surface of said rings is worn. In consequence of the changing of the arc of the bearing surfaces without changing the angularity of the abutting ends of the wearing rings, the rings become loose relatively to the body 1 they are supposed to pack, said rings rocking and thereby not forming a non-leakable connection said rings are to establish. Now, the arc of the sections 6 does not change, as the lips 13 must be worn off before the ends of the tongues abut, and as such wear upon the lips requires considerable time, the efficiency of the sections 6 is established for an equal period of time.

Associated with the packing ring A is the packing ring B comprising sections 14 having lips 15 and grooves 16 to receive a coiled compression spring similar to the spring 12. In positioning the sections of the packing ring B relatively to the sections of the packing ring A, the lips 15 of the packing ring B are alternately arranged relatively to the lips 13 of the packing ring A, whereby the space between the ends of the sections 14 of the ring B will be closed by the solid portion of the sections of the ring A.

The tension of the coiled compression springs is sufficient to normally retain the sections of the packing rings snugly clamped upon the periphery of the movable body, and it is an extremely easy matter to repair the packing should occasion demand or to entirely renew the same.

It is apparent from the foregoing that the packing is suitable for cases fitting inside of a stuffing box or bolted to the cylinder head, and I reserve the right to use any strong and durable material throughout the construction.

What I claim is:—

1. A packing ring formed of a plurality of sections, oppositely disposed tapering lips projecting from the ends of each section, the inner edge of each lip forming a continuation of the inner edge of each section, and resilient means arranged circumferentially of the sections for retaining them in ring-like form and with the points of the lips of one section abutting against the points of the lips of adjacent sections.

2. A packing ring formed of a plurality of segment-shaped sections, each of said sections having each of its ends cut away to provide a tongue, a tapering lip extending from each of said tongues, the inner edges of said tongues and lips forming a continuation of the inner edges of said sections, bridge members positioned against said tongues and having their ends spaced from the ends of the sections, and resilient means arranged circumferentially of said sections and bridge members for maintaining said sections in ring-like form with the points of the lips of one section abutting against the lips of an adjacent section.

3. A packing comprising sets of sectional rings, each of the sections of each ring segment-shaped in contour and provided at each end with a tapering lip having its inner edge forming a continuation of the inner edge of its respective section, said lips being oppositely disposed, and resilient means arranged circumferentially of each set of rings for maintaining the sections thereof in ring-like form with the points of the lips of one section abutting against the points of the lips of adjacent sections, the abutting lips of one ring being alternately disposed with respect to the abutting lips of the other ring.

4. A packing comprising sets of rings, each ring formed of a plurality of segment-shaped sections, tapering lips carried by the confronting ends of said sections, resilient means arranged circumferentially of said rings for maintaining the sections thereof in ring-like form with the points of the lips of one section abutting against the points of the lips of adjacent sections, and bridge members seated in the sections of one of said rings and having the outer edge thereof forming a continuation of the outer edge of the ring with which the members associate, said means seated in said members.

5. A packing comprising sets of rings, each ring formed of a plurality of segment-shaped sections, tapering lips carried by the confronting ends of said sections, resilient means arranged circumferentially of said rings for maintaining the sections thereof in ring-like form with the points of the lips of one section abutting against the points of the lips of adjacent sections, and bridge members seated in the sections of one of said rings and having the outer edge thereof forming a continuation of the outer edge of the ring with which the members associate, said means seated in said members, the abutting points of the lips of one ring being alternately disposed with respect to the abutting points of the lips of an adjacent ring.

6. A packing comprising a case having interiorly arranged annular grooves, a set of packing rings mounted in each of the grooves of said case, each of said rings comprising segment-shaped sections, oppositely disposed tapering lips projecting from the ends of said sections and each having its inner edge forming a continuation of the inner edge of its respective section, and means arranged in the outer edges of said sections for maintaining them in ring-like form with the points of the lips of one section abutting against the points of the lips of adjacent sections.

7. A packing comprising a case having interiorly arranged annular grooves, a set of packing rings mounted in each of the grooves of said case, each of said rings comprising segment-shaped sections, oppositely disposed tapering lips projecting from the ends of said section and each having its inner edge forming a continuation of the inner edge of its respective section, and means arranged in the outer edges of said sections for maintaining them in ring-like form with the points of the lips of one section abutting against the points of the lips of adjacent sections, the abutting points of the lips of a ring of one set alternately disposed with respect to the abutting points of an adjacent ring of a set.

In testimony whereof I affix my signature in the presence of two witnesses.

ALLEN W. JOINER.

Witnesses:
M. H. THOMAS,
K. G. FLEMING.